United States Patent
Park et al.

(10) Patent No.: US 11,945,925 B2
(45) Date of Patent: Apr. 2, 2024

(54) POLYIMIDE-BASED FILM, FILM FOR COVER WINDOW, AND DISPLAY DEVICE INCLUDING THE SAME

(71) Applicants: SK Innovation Co., Ltd., Seoul (KR); SK IE Technology Co., Ltd., Seoul (KR)

(72) Inventors: Jin Su Park, Daejeon (KR); Keon Hyeok Ko, Daejeon (KR); Byoung Sun Ko, Daejeon (KR); Jong Nam Ahn, Daejeon (KR); Tae Sug Jang, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 233 days.

(21) Appl. No.: 16/919,293

(22) Filed: Jul. 2, 2020

(65) Prior Publication Data

US 2021/0002440 A1 Jan. 7, 2021

(30) Foreign Application Priority Data

Jul. 5, 2019 (KR) .......................... 10-2019-0081219

(51) Int. Cl.
| | |
|---|---|
| *C08J 7/04* | (2020.01) |
| *C08G 73/14* | (2006.01) |
| *C08J 5/18* | (2006.01) |
| *C08J 7/046* | (2020.01) |
| *C09D 5/00* | (2006.01) |
| *C09D 183/06* | (2006.01) |
| *G02B 1/14* | (2015.01) |
| *G02B 1/18* | (2015.01) |

(52) U.S. Cl.
CPC ............ *C08J 7/0427* (2020.01); *C08G 73/14* (2013.01); *C08J 5/18* (2013.01); *C08J 7/046* (2020.01); *C09D 5/00* (2013.01); *C09D 183/06* (2013.01); *G02B 1/14* (2015.01); *G02B 1/18* (2015.01); *C08J 2379/08* (2013.01); *C08J 2383/06* (2013.01)

(58) Field of Classification Search
CPC . C08J 7/0427; C08J 5/18; C08J 7/046; C08G 73/14; C09D 183/06; C09D 5/00; G02B 1/14; G02B 1/18
USPC ......................................... 428/219
See application file for complete search history.

(56) References Cited

U.S. PATENT DOCUMENTS

| | | | |
|---|---|---|---|
| 2013/0252053 A1 | 9/2013 | Woo | |
| 2014/0338959 A1* | 11/2014 | Jung | ........................ C08J 7/043 174/253 |
| 2018/0044476 A1* | 2/2018 | Park | ................... C08G 73/1021 |
| 2018/0230278 A1 | 8/2018 | Han et al. | |
| 2019/0009505 A1 | 1/2019 | Song et al. | |
| 2019/0367677 A1 | 12/2019 | Oh et al. | |
| 2019/0375894 A1 | 12/2019 | Sakayori et al. | |

(Continued)

FOREIGN PATENT DOCUMENTS

| | | |
|---|---|---|
| CN | 102035012 A | 4/2011 |
| JP | H6145476 A | 5/1994 |
| JP | 2013209560 A | 10/2013 |

(Continued)

*Primary Examiner* — Tahseen Khan
(74) *Attorney, Agent, or Firm* — The Webb Law Firm (57) ABSTRACT

Provided are a polyimide-based film having excellent visibility, a film for a cover window, and a display device including the same.

8 Claims, 1 Drawing Sheet

(56) References Cited

U.S. PATENT DOCUMENTS

2019/0390014 A1* 12/2019 Kim .................. C08G 73/1067

FOREIGN PATENT DOCUMENTS

| JP | 20191989 A | 1/2019 | | |
|---|---|---|---|---|
| KR | 1020150104282 A | 9/2015 | | |
| KR | 1020160082639 A | 7/2016 | | |
| KR | 101831884 B1 | 2/2018 | | |
| KR | 1020180093655 A | 8/2018 | | |
| KR | 1020180106212 A | 10/2018 | | |
| KR | 1020190005673 A | 1/2019 | | |
| KR | 1020190039180 A | 4/2019 | | |
| KR | 1020190063306 A | 6/2019 | | |
| WO | WO-2018147605 A1 * | 8/2018 | ......... | C08G 73/1039 |

* cited by examiner

POLYIMIDE-BASED FILM, FILM FOR COVER WINDOW, AND DISPLAY DEVICE INCLUDING THE SAME

CROSS-REFERENCE TO RELATED APPLICATIONS

This application claims priority to Korean Patent Application No. 10-2019-0081219 filed Jul. 5, 2019, the disclosure of which is hereby incorporated by reference in its entirety.

TECHNICAL FIELD

The following disclosure relates to a polyimide-based film, a film for a cover window, and a display device including the same. More particularly, the present invention relates to a film for a cover window having excellent optical properties such as visibility and a display device including the same.

BACKGROUND

Display devices are provided with a cover window configured to be transparent on a display panel so that a user may see a display unit from a front of the display panel, in order to protect the display panel from scratches or external shock.

Since display devices gradually become more lightweight, thinner, and flexible, a cover window manufactured from a polymer film having high hardness, high stiffness, and flexibility properties is studied a lot, instead of tempered glass.

Since the cover window is a constituent formed in the outermost part of the display device, it is important for the cover window to have high display quality and not to cause distortion by light such as a mura phenomenon, a blackout phenomenon in which a screen looks black at a certain angle, or a rainbow phenomenon having iridescent stains.

In particular, as a coating layer is laminated on a substrate layer for imparting various physical properties, the cover window has problems of causing diffused reflection of light or the like, producing optical stains to worsen visibility, and causing eye strain when applied to a display.

That is, though polymer cover window materials for replacing high-priced tempered glass have been diversely developed, development of a cover window which may solve a distortion problem by light of the cover window is currently needed.

RELATED ART DOCUMENTS

Patent Documents (Patent Document 1) Korean Patent Laid-Open Publication No. 10-2015-0104282

SUMMARY

An embodiment of the present invention is directed to providing a display device having excellent visibility.

Another embodiment of the present invention is directed to providing a polyimide-based film of which the rainbow phenomenon is significantly improved.

In one general aspect, a polyimide-based film has a surface hardness change rate of 6 to 35%, the surface hardness change rate being defined as follows:

$$\text{Surface hardness change rate (\%)} = \frac{H_0 - H_1}{H_0} \times 100$$

wherein $H_0$ is a surface hardness (GPa) of the polyimide-based film measured before being immersed in 2-methoxyethanol, and $H_1$ is a surface hardness (GPa) of the polyimide-based film measured after being immersed in 2-methoxyethanol at 25° C. for 5 minutes.

The polyimide-based film according to an exemplary embodiment of the present invention may have a surface hardness change rate of 10% to 30%.

In the surface hardness change rate according to an embodiment of the present invention, $H_0$ may be 0.1 to 0.2 GPa.

The polyimide-based film according to an exemplary embodiment of the present invention may have a haze increase rate of 100% or less relative to a haze measured before immersion, when measuring the haze after immersing the film in methyl ethyl ketone at 25° C. for 5 minutes.

The polyimide-based film according to an exemplary embodiment of the present invention may have a haze measured before immersion of 1.5% or less.

In another general aspect, a film for a cover window includes the polyimide-based film described above; and a coating layer formed on the polyimide-based film.

The coating layer according to an exemplary embodiment of the present invention may be any one or more selected from a hard coating layer, a restoration layer, an impact spread layer, a self-cleaning layer, an anti-fingerprint layer, an anti-scratch layer, a low-refractive layer, and an impact absorption layer.

The coating layer according to an exemplary embodiment of the present invention may have a solid content of 0.01 to 200 g/m², based on a total area of the polyimide-based film.

In still another general aspect, a display device includes: a display panel and the film for a cover window described above formed on the display panel.

Other features and aspects will be apparent from the following detailed description, the drawings, and the claims.

DETAILED DESCRIPTION OF EMBODIMENTS

Hereinafter, the present invention will be described in more detail with reference to specific examples and exemplary embodiments including the accompanying drawings. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain specific example and are not intended to limit the present invention.

Throughout the present specification describing the present invention, unless explicitly described to the contrary, "comprising" any elements will be understood to imply further inclusion of other elements rather than the exclusion of any other elements.

In addition, the singular form used in the specification and claims appended thereto may be intended to also include a plural form, unless otherwise indicated in the context.

On a cover window film which is a constituent formed on the outermost part of a display device, a phenomenon occurring by light is directly visible to the naked eye, and thus, it is important for the cover window not to cause distortion by light. In the cover window film, tempered glass was conventionally used, but development of a polymer material which may solve a distortion problem by light as described above is currently needed. Thus, the present inventors found that excellent visibility may be implemented by using a polyimide-based film having a surface hardness change rate in a certain range, and furthermore, when a coating layer is laminated on the polyimide-based film, a film for a cover window having significantly improved rainbow phenomenon may be provided, thereby completing the present invention.

In order to achieve the above objects, the polyimide-based film according to the present invention has a surface hardness change rate of 6 to 35%, the surface hardness change rate being defined as follows:

$$\text{Surface hardness change rate (\%)} = \frac{H_0 - H_1}{H_0} \times 100$$

wherein $H_0$ is a surface hardness (GPa) of the polyimide-based film measured before being immersed in 2-methoxyethanol, and $H_1$ is a surface hardness (GPa) of the polyimide-based film measured after being immersed in 2-methoxyethanol at 25° C. for 5 minutes.

Specifically, the surface hardness (H) is measured from a slope of indentation load (P)-displacement (h) curve (S=dP/dh) and an impression area (A), when removing a load from an indentation load in a nanoindentation test.

The polyimide-based film according to the present invention may, even in the case of including various coating layers on the polyimide-based film implementing the surface hardness change rate before and after immersion in 2-methoxyethanol as described above, significantly reduce a rainbow phenomenon in which iridescent stains are formed, when seen at various angles, and thus, is excellent in a display device such as smartphones, monitors, laptops, and TV.

When the surface hardness change rate before and after immersion in 2-methoxyethanol is less than 6%, the rainbow phenomenon in which iridescent stains occur when the coating layer is formed on the polyimide-based film, is still not improved. When the surface hardness change rate is more than 35%, the film may not be used as an optical film by a high haze.

According to an exemplary embodiment of the present invention, in order to prevent image distortion by light to further improve visibility, preferably, the polyimide-based film may have a surface hardness change rate satisfying 10 to 30%. More preferably, the surface hardness change rate may satisfy 15 to 25%.

According to an exemplary embodiment of the present invention, specifically, in the surface hardness change rate, $H_0$ may be 0.1 to 0.2 GPa. Preferably, $H_0$ may be 0.1 to 0.18 GPa.

According to an exemplary embodiment of the present invention, both surfaces of the polyimide-based film may be surface-treated in order to satisfy the surface hardness change rate described above. Specifically, surface treatment may be heat treatment under a solvent steam atmosphere, for example, heat treatment under a polar solvent steam atmosphere, and the heat treatment may be performed at a temperature of 260 to 300° C. for 10 to 60 minutes. Preferably, the heat treatment may be performed at a temperature of 270 to 290° C. for 10 to 30 minutes.

According to an exemplary embodiment of the present invention, the polar solvent steam used in the surface treatment may be derived from any one or more solvents selected from dimethylacetamide (DMAc), N-methyl-2-pyrrolidone (NMP), dimethylformamide (DMF), dimethylformsulfoxide (DMSO), acetone, ethyl acetate, propylene glycol methyl ether, m-cresol, methanol, ethanol, isopropanol, butanol, 2-methoxyethanol, methylcellosolve, ethylcellosolve, methyl ethyl ketone, methyl butyl ketone, methyl isobutyl ketone, methyl phenyl ketone, diethyl ketone, dipropyl ketone, cyclohexanone, hexane, heptane, octane, benzene, toluene, xylene, and the like. Specifically, the polar solvent steam may be the same as or different from a coating solvent of the coating layer formed on the polyimide-based film. When the surface treatment solvent steam is different from the coating solvent, it may be methyl ethyl ketone or methyl phenyl ketone. The polyimide-based film as the above may satisfy the surface hardness change rate described above, suppress a rainbow phenomenon in which iridescent stains occur after forming the coating layer on the polyimide-based film to prevent a rapid increase in haze, and have excellent visibility.

According to an exemplary embodiment of the present invention, the polyimide-based film may have a haze increase rate of 100% or less relative to a haze measured before immersing the film in methyl ethyl ketone, when measuring the haze after immersing the film in methyl ethyl ketone at 25° C. for 5 minutes. The haze increase rate may be preferably 90% or less, more preferably 70% or less, and most preferably 60% or less. The polyimide-based film may maintain transparency even under a high temperature and high humidity environment by having a low haze increase rate before and after immersion in methyl ethyl ketone as described above.

According to an exemplary embodiment of the present invention, the polyimide-based film may have a haze measured before immersion of 1.5% or less. The haze may be preferably 1.2% or less, and more preferably 1.0% or less. Specifically, the haze may be 0.01 to 1.5%, preferably 0.01 to 1.2%, and more preferably 0.01 to 1.0%. The polyimide-based film may provide a transparent optical film, by having such a haze to prevent discoloration.

The polyimide-based film as described above has the surface hardness change rate to 2-methoxyethanol described above, thereby not causing a distortion phenomenon of light even when various functional coating layers are formed on the polyimide-based film, and particularly suppressing a rainbow phenomenon in which iridescent stains occur, and thus, may be provided as a film for a cover window having excellent visibility.

According to an exemplary embodiment of the present invention, the polyimide-based film is derived from a monomer mixture including dianhydride and diamine to be provided as a polyimide film including a polymerized polyimide resin. The dianhydride and the diamine are not particularly limited as long as they are commonly used materials known in the art.

According to an exemplary embodiment of the present invention, the diamine is, for example, any one or more selected from aliphatic diamine, aromatic diamine, and the like.

More specifically, the aromatic diamine is not largely limited, but, for example, may be any one or more selected from bis trifluoromethyl benzidine (TFDB), bis(3-aminophenyl)sulfone (3DDS), bis(4-aminophenyl)sulfone (ODDS), diaminophenylether, o-phenylenediamine (o-PDA), p-phenylenediamine (p-PDA), m-phenylenediamine (m-PDA), oxydianiline (ODA), methylenedianiline (MDA), bisaminophenylhexafluoropropane (HFDA), 1,3-bis(4-aminophenoxy)benzene (TPE-R), and the like.

The aliphatic diamine is not largely limited, but, for example, may be any one or more selected from 1,4-diaminocyclohexane, 1,4-cyclohexanebis(methylamine), 4,4'-diaminodicyclohexylmethane (MCA), 4,4'-methylenebis(2-methylcyclohexylamine) (MMCA), ethylenediamine (EN), 1,3-diaminopropane (13DAP), tetramethylenediamine, 1,6-hexamethylenediamine (16DAH), 1,12-diaminododecane (112DAD), and the like.

According to an exemplary embodiment of the present invention, the dianhydride may be any one or more selected from aliphatic dianhydrides, aromatic dianhydrides, and the like.

More specifically, according to an exemplary embodiment of the present invention, the aromatic dianhydride is not largely limited, but, for example, may be any one or more selected from 4,4'-hexafluoroisopropylidene diphthalic anhydride (6FDA), 1,2,4,5-benzenetetracarboxylic dianhydride (PMDA), biphenyltetracarboxylic dianhydride (BPDA), benzophenone tetracarboxylic dianhydride (BTDA), 4,4'-oxydiphthalic dianhydride (ODPA), bisdicarboxyphenoxy diphenylsulfide dianhydride (BDSDA), and the like, but is not limited thereto.

The aliphatic dianhydride is not largely limited, but, for example, any one or more selected from 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclooxtene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride, 1,2,3,4-tetracarboxycyclopentane dianhydride, and the like, may be used.

According to an exemplary embodiment, the dianhydride may be included at 5 to 80 mol, and preferably 10 to 70 mol, based on 100 mol of the diamine, to be copolymerized.

When the dianhydride is included within the above range, a polyimide film having excellent visibility and optical properties may be provided.

The polyimide film produced from the composition described above may have significantly improved visibility, when laminating a coating layer on the polyimide film.

According to an exemplary embodiment of the present invention, the polyimide-based film may further include an aromatic diacid dichloride in the monomer mixture for improving mechanical physical properties, to be provided as a polyamideimide film including a polyamideimide resin.

The aromatic diacid dichloride is not largely limited, but, for example, may include any one or more selected from terephthaloyl dichloride (TPC), isophthaloyl dichloride (IPC), 1,1'-biphenyl-4,4'-dicarbonyl dichloride (BPC), 1,4-naphthalenedicarboxylic dichloride (1,4-NaDC), 2,6-naphthalenedicarboxylic dichloride (2,6-NaDC), 1,5-naphthalenedicarboxylic dichloride (1,5-NaDC), and the like. Preferably, the aromatic diacid dichloride includes any one or more selected from terephthaloyl dichloride, isophthaloyl dichloride, and the like.

In addition, the aromatic diacid dichloride is not limited to the compounds as exemplified above and may be used further in combination with other acid halide compounds, but it is preferred to use the aromatic diacid dichloride alone.

According to an exemplary embodiment, the aromatic diacid dichloride may be included at 20 to 95 mol, and preferably 30 to 90 mol, based on 100 mol of the diamine, to be copolymerized.

According to an exemplary embodiment, the dianhydride and the aromatic diacid dichloride may be included at a mole ratio of 5:95 to 80:20, and preferably at a mole ratio of 10:90 to 70:30.

The polyamideimide film produced from the composition described above may have excellent mechanical properties, prevent a distortion phenomenon by light, and improve optical properties such as a low haze and yellowness.

According to an exemplary embodiment of the present invention, the polyimide-based film may be produced by being derived from a polyimide resin derived from the monomer mixture or a polyamic acid resin composition which is a precursor of a polyamideimide resin. Specifically, for example, the polyamic acid resin composition is a solution of the monomers described above and includes a polymerization solvent for a solution polymerization reaction. The kind of polymerization solvent is not particularly limited, and for example, it may be a polar solvent, and specifically, may include any one more selected from dimethylacetamide (DMAc), N-methyl-2-pyrrolidone (NMP), dimethylformamide (DMF), dimethylformsulfoxide (DMSO), acetone, diethylacetate, m-cresol and the like.

According to an exemplary embodiment of the present invention, the polyimide-based film may have a thickness of 20 to 200 μm. The thickness may be preferably 20 to 100 μm, and more preferably 25 to 90 μm. Within the range of thickness described above, the polyimide-based film may have excellent transparency and secure excellent visibility. Furthermore, when a coating layer is formed on the polyimide-based film, a rainbow phenomenon hardly occurs, and thus, the polyimide-based film is excellent as an optical film.

According to an exemplary embodiment of the present invention, the polyimide-based film may be produced from a composition for forming a polyimide-based film. The composition for forming a polyimide-based film may include the polyimide resin and an organic solvent. Otherwise, the composition may include the polyamideimide resin and an organic solvent. The organic solvent is not particularly limited as long as it may dissolve a polyimide resin or a polyamideimide resin; however, for example, may be any one or more selected from dimethylacetamide (DMAc), N-methyl-2-pyrrolidone (NMP), dimethylformamide (DMF), dimethylformsulfoxide (DMSO), acetone, ethyl acetate, m-cresol, and the like, but is not limited thereto.

According to an exemplary embodiment of the present invention, the composition for forming a polyimide-based film is not particularly limited as to a method of forming a film, but for example, the composition for forming a polyimide-based film may be applied on a substrate and dried to form a film. As the substrate, for example, glass, ceramic, a polymer film, or the like may be used, but is not limited thereto. For application, any one or more methods selected from a spin coating method, a dipping method, a spraying method, a die coating method, a bar coating method, a roll coater method, a meniscus coating method, a flexo printing method, a screen printing method, a bead coating method, an airknife coating method, a reverse roll coating method, a blade coating method, a casting coating method, a gravure coating method, and the like, may be used, but is not limited thereto.

Another embodiment of the present invention provides a film for a cover window including: the polyimide-based film described above; and a coating layer formed on the polyimide-based film.

When the coating layer is laminated on the polyimide-based film having a certain range of a surface hardness change rate, a film for a cover window having significantly improved visibility may be provided.

According to an exemplary embodiment of the present invention, the coating layer is for imparting functionality of the film for a cover window and may be variously applied depending on the purpose.

Specifically, for example, the coating layer may include any one or more layers selected from a hard coating layer, a restoration layer, an impact spread layer, a self-cleaning layer, an anti-fingerprint layer, an anti-scratch layer, a low-refractive layer, an impact absorption layer, and the like, but is not limited thereto.

Even in the case in which various coating layers as described above are formed on the polyimide-based film, a film for a cover window having excellent display quality, high optical properties, and a significantly reduced rainbow phenomenon, may be provided.

According to an exemplary embodiment of the present invention, specifically, the coating layer may be formed on one surface or both surfaces of the polyimide-based film. For example, the coating layer may be disposed on an upper surface of the polyimide-based film or disposed on each of an upper surface and a lower surface of the polyimide-based film. The coating layer may protect the polyimide-based film having excellent optical and mechanical properties from external physical or chemical damage.

According to an exemplary embodiment of the present invention, the coating layer may be formed after surface treatment as described above, so that the polyimide-based film satisfies a certain surface hardness change rate, when the coating layer is formed on the polyimide-based film. Specifically, after the polyimide-based film is surface-treated, a composition for forming a coating layer is applied to form the coating layer. The film for a cover window produced as described above may have excellent optical properties and significantly reduce a rainbow phenomenon to have excellent visibility.

According to an exemplary embodiment of the present invention, the coating layer may have a solid content of 0.01 to 200 $g/m^2$, based on a total area of the polyimide-based film. Preferably, the solid content may be 20 to 150 $g/m^2$, based on the total area of the polyimide-based film. By providing the basis weight described above, surprisingly, the film may not cause a rainbow phenomenon while maintaining functionality to implement excellent visibility.

According to an exemplary embodiment of the present invention, specifically, the coating layer may be formed by applying the coating layer in the state of a composition for forming a coating layer including a coating solvent on the polyimide-based film. The coating solvent is not particularly limited, but preferably, may be a polar solvent. For example, the polar solvent may be any one or more solvents selected from an ether-based solvent, a ketone-based solvent, an alcohol-based solvent, an amide-based solvent, a sulfoxide-based solvent, an aromatic hydrocarbon-based solvent, and the like. Specifically, the polar solvent may be any one or more solvents selected from dimethylacetamide (DMAc), N-methyl-2-pyrrolidone (NMP), dimethylformamide (DMF), dimethylformsulfoxide (DMSO), acetone, ethyl acetate, propylene glycol methyl ether, m-cresol, methanol, ethanol, isopropanol, butanol, 2-methoxyethanol, methylcellosolve, ethylcellosolve, methyl ethyl ketone, methyl butyl ketone, methyl isobutyl ketone, methyl phenyl ketone, diethyl ketone, dipropyl ketone, cyclohexanone, hexane, heptane, octane, benzene, toluene, xylene, and the like.

According to an exemplary embodiment of the present invention, as a method of forming the coating layer by applying the composition for forming a coating layer on the polyimide-based film, any one or more methods selected from a spin coating method, a dipping method, a spraying method, a die coating method, a bar coating method, a roll coater method, a meniscus coating method, a flexo printing method, a screen printing method, a bead coating method, an airknife coating method, a reverse roll coating method, a blade coating method, a casting coating method, a gravure coating method, and the like, may be used, but is not limited thereto.

Preferably, according to an exemplary embodiment of the present invention, the coating layer may be a hard coating layer. The hard coating layer may include any one or more selected from organic materials and inorganic materials. For example, the organic material includes carbon, and may include any one or more selected from carbon mainly, and nonmetallic elements such as hydrogen, oxygen, and nitrogen. The inorganic material refers to a material other than the organic material and may include any one or more selected from metal elements such as alkali earth metals, alkali metals, transition metals, post transition metals, and metalloids. As an example, the inorganic material may include carbon dioxide, carbon monoxide, diamond, carbonate, and the like, as a subject for exception.

According to an exemplary embodiment, the hard coating layer may be a single layer of an organic material layer or an inorganic material layer, or a mixed layer of an organic material and an inorganic material, and though it is not particularly limited, preferably, may include 10 to 90 wt % of the organic material and 10 to 90 wt % of the inorganic material. Preferably, the hard coating layer may include 40 to 80 wt % of the organic material and 20 to 60 wt % of the inorganic material. Even in the case in which the hard coating layer including the organic material and the inorganic material is formed as described above, bonding with the polyimide-based film is excellent, no distortion of light occurs, and in particular, an effect of improving a rainbow phenomenon is excellent.

According to an exemplary embodiment of the present invention, though the hard coating layer is not particularly limited, the hard coating layer may be, for example, a layer including any one or more polymers selected from an acryl-based polymer, a silicon-based polymer, an epoxy-based polymer, an urethane-based polymer, and the like.

Specifically, the hard coating layer prevents deterioration of optical properties when being formed on the polyimide-based film and may be a layer formed from a composition for forming a coating layer including an epoxysilane resin for improving a surface hardness. Specifically, the epoxysilane resin may be a siloxane resin including an epoxy group. The epoxy group may be a cyclic epoxy group, an aliphatic epoxy group, an aromatic epoxy group, or a mixture thereof. The siloxane resin may be a polymer compound in which a silicon atom and an oxygen atom form a covalent bond.

Preferably, for example, the epoxy siloxane resin may be a silsesquioxane resin. Specifically, the epoxy siloxane resin may be a compound in which an epoxy group is directly substituted on a silicon atom of the silsesquioxane compound or an epoxy group is substituted on a substituent substituted on the silicon atom. As a non-limiting example, the epoxy siloxane resin may be a silsesquioxane resin substituted by a 2-(3,4-epoxycyclohexyl) group or a 3-glycidoxy group.

The epoxy siloxane resin may be produced from alkoxysilane having an epoxy group alone or hydrolysis and condensation reactions between alkoxysilane having an epoxy group and another kind of alkoxysilane, in the presence of water. In addition, the epoxysilane resin may be formed by polymerizing a silane compound including an epoxycyclohexyl group.

For example, the alkoxysilane compound having an epoxy group may be any one or more selected from 2-(3, 4-epoxycyclohexyl)ethyltrimethoxysilane, 2-(3,4-epoxycyclohexyl)ethyltriethoxysilane, 3-glycidoxypropyltrimethoxysilane, and the like.

According to an exemplary embodiment of the present invention, the epoxy siloxane resin may have a weight average molecular weight of 1,000 to 20,000 g/mol, but is not limited thereto. When the epoxy siloxane resin has the weight average molecular weight in the above range, it has an appropriate viscosity, thereby improving flowability, coatability, curing reactivity, and the like of the composition for forming a coating layer, and improving the surface hardness of the hard coating layer.

According to an exemplary embodiment of the present invention, the epoxy siloxane resin may be included at 20 to 65 wt %, and preferably 20 to 60 wt %, based on a total weight of the composition for forming a coating layer. When the epoxy siloxane resin is included within the above range, the surface hardness of the hard coating layer may be improved, and uniform curing may be derived to prevent physical defects such as cracks due to partial overcuring.

According to an exemplary embodiment of the present invention, the composition for forming a coating layer may further include a crosslinking agent and an initiator.

Specifically, the crosslinking agent is not particularly limited as long as it may form a crosslink with the epoxy siloxane resin to solidify the composition for forming a coating layer and improve a hardness of the hard coating layer, but the crosslinking agent may be, for example, any one or more selected from (3,4-epoxycyclohexyl)methyl-3', 4'-epoxycyclohexanecarboxylate, digylcidyl 1,2-cyclohexanedicarboxylate, 2-(3,4-epoxycyclohexyl-5,5-spiro-3, 4-epoxy)cyclohexane-meta-dioxane, bis(3,4-epoxycyclohexylmethyl)adipate), bis(3,4-epoxy-6-methylcyclohexyl)adipate, 3,4-epoxy-6-methylcyclohexylmethyl-3',4'-epoxy-6'-methylcyclohexanecarboxylate, 1,4-cyclohexanedimethanol bis(3,4-epoxycyclohexanecarboxylate), ethylene bis(3,4-epoxycyclohexanecarboxylate), 3,4-epoxycyclohexylmethyl (meth)acrylate, bis(3,4-epoxycyclohexylmethyl)adipate, 4-vinylcyclohexenedioxide, vinylcyclohexene monoxide, 1,4-cyclohexanedimethanol diglycidyl ether, 2,2'-((1-methylethylidene)bis(cyclohexane-4,1-diyloxymethylene)) bisoxirane, and the like. Preferably, the crosslinking agent may be any one or more selected from (3,4-epoxycyclohexyl)methyl-3',4'-epoxycyclohexanecarboxylate, bis(3,4-epoxycyclohexylmethyl)adipate), and the like including a compound in which two 3,4-epoxycyclohexyl groups are connected.

According to an exemplary embodiment of the present invention, the content of the crosslinking agent is not particularly limited, and for example, may be 5 to 150 parts by weight, based on 100 parts by weight of the epoxy siloxane resin. In addition, according to an exemplary embodiment of the present invention, the crosslinking agent may be included at 3 to 30 wt %, and preferably 5 to 20 wt %, based on the total weight of the composition for forming a coating layer. Within the range, the coatability and curing reactivity of the composition for forming a coating layer may be improved.

According to an exemplary embodiment of the present invention, the initiator may be a photoinitiator or a thermal initiator. Preferably, the initiator may be a photoinitiator, and for example, the photoinitiator may include a photo-cationic initiator. The photo-cationic initiator may initiate polymerization of the epoxy siloxane resin and an epoxy-based monomer.

Specifically, the photo-cationic initiator may be any one or more selected from onium salts, organic metal salts, and the like, but is not limited thereto. For example, the photo-cationic initiator may be any one or more selected from a diaryliodonium salt, a triarylsulfonium salt, an aryldiazonium salt, an iron-arene complex, and the like, but is not limited thereto.

According to an exemplary embodiment of the present invention, the content of the photoinitiator is not particularly limited, and for example, may be 1 to 15 parts by weight, based on 100 parts by weight of the epoxy siloxane resin. In addition, according to an exemplary embodiment of the present invention, the photoinitiator may be included at 0.1 to 10 wt %, and preferably 0.3 to 5 wt %, based on the total weight of the composition for forming a coating layer. When the content of the photoinitiator is within the above range, curing efficiency of the hard coating layer is excellent and deterioration of the physical properties due to residual components after curing may be prevented.

According to an exemplary embodiment of the present invention, the composition for forming a coating layer may further include any one or more additives selected from fillers, slip agents, photostabilizers, thermal polymerization prohibition agents, leveling agents, lubricants, antifoulants, thickeners, surfactants, antifoaming agents, anti-static agents, dispersants, initiators, coupling agents, antioxidants, UV stabilizers, colorants, and the like, but it not limited thereto.

More specifically, the hard coating layer may further include inorganic particles for imparting hardness.

The inorganic particles may be preferably silica, and more preferably surface-treated silica, but is not limited thereto. Here, surface treatment may be inclusion of a functional group capable of reacting with the crosslinking agent described above.

According to an exemplary embodiment, the inorganic particles may have an average particle diameter of 1 to 500 nm, and preferably 10 to 300 nm, but is not limited thereto.

When a hard coating layer described above is formed on the conventional polyimide-based film, a rainbow phenomenon was not able to be avoided by distortion of light. However, the polyimide-based film according to the present invention hardly causes a rainbow phenomenon even in the case in which the hard coating layer is formed and may implement excellent visibility.

According to an exemplary embodiment of the present invention, the film for a cover window may further include a substrate layer. The substrate layer may be formed on the other surface of the polyimide-based film on which the coating layer is not formed.

According to an exemplary embodiment of the present invention, the polyimide-based film may be laminated on the substrate layer after being produced into a film, or may be laminated after applying a polyamic acid resin composition which is a precursor of the polyimide-based film to be coated, but is not particularly limited as long as it may form a lamination configuration described above.

According to an exemplary embodiment of the present invention, the substrate layer is not particularly limited as long as it is a substrate film of a film for a cover window which is commonly used, but for example, may include any one or more selected from an ester-based polymer, a carbonate-based polymer, a styrene-based polymer, an acryl-based polymer, and the like. Specifically, for example, the substrate layer may include any one or more selected from polyethylene terephthalate, polyethylene naphthalate, polybutylene terephthalate, polybutylene naphthalate, polycarbonate, polystyrene, polymethylmethacrylate, and the like, but is not limited thereto.

According to an exemplary embodiment of the present invention, the substrate layer may be a single layer or a multiple layer in which two or more layers are laminated. Specifically, the substrate layer may include an optical adhesive layer on an interface of two or more substrate films and be laminated.

According to an exemplary embodiment of the present invention, the substrate layer may have a thickness of 50 to 300 μm. The thickness may be preferably 100 to 300 μm, and more preferably 150 to 250 μm. By having the thickness described above, the substrate layer may satisfy mechanical physical properties, and also significantly reduce a distortion phenomenon of light, when laminating the polyimide-based film.

According to an exemplary embodiment of the present invention, specifically, for example, the optical adhesive layer may include any one or more selected from an optical clear adhesive (OCA), an optical clear resin (OCR), a pressure sensitive adhesive (PSA), and the like, but is not limited thereto.

According to an exemplary embodiment of the present invention, the film for a cover window may further include a second optical adhesive layer on an interface between the substrate layer and the polyimide-based film.

Specifically, the second optical adhesive layer formed on the interface between the substrate layer and the polyimide-based film may be the same as or different material from the optical adhesive layer in the substrate layer described above, and for example, may be formed to a thickness of 20 to 120 μm. Preferably, the thickness may be 20 to 50 μm. When the thickness is formed within the above range, the film for a cover window may implement overall excellent optical properties and a light distortion improvement effect.

According to an exemplary embodiment of the present invention, the film for a cover window may have a high surface hardness, have excellent flexibility, be lighter than tempered glass, and have excellent durability against deformation, and thus, is excellent as a window substrate on the outermost surface of a flexible display panel.

Another embodiment of the present invention provides a display device including: a display panel and the film for a cover window described above formed on the display panel.

According to an exemplary embodiment of the present invention, the display device is not particularly limited as long as it belongs to a field requiring excellent optical properties and may be provided by selecting a display panel appropriate therefor. Preferably, the film for a cover window may be applied to a flexible display device, and specifically, for example, may be included and applied to any one or more image display devices selected from various image display devices such as a liquid crystal display device, an electroluminescence display device, a plasma display device, and a field emission display device, but is not limited thereto.

The display device including the film for a cover window of the present invention described above has excellent display quality to be displayed and also a significantly reduced distortion phenomenon by light, and thus, particularly, may significantly improve a rainbow phenomenon in which iridescent stains occur and minimize user's eye strain with excellent visibility.

The polyimide-based film, the film for a cover window, and the display device including the same according to the present invention will be described in more detail, by the Examples.

However, the following Examples are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain exemplary embodiment, and not intended to limit the present invention.

Further, unless otherwise stated, the unit of added materials herein may be wt %.

The physical properties of the present invention were measured as follows:

(1) Surface Hardness (H)

Figure 1:
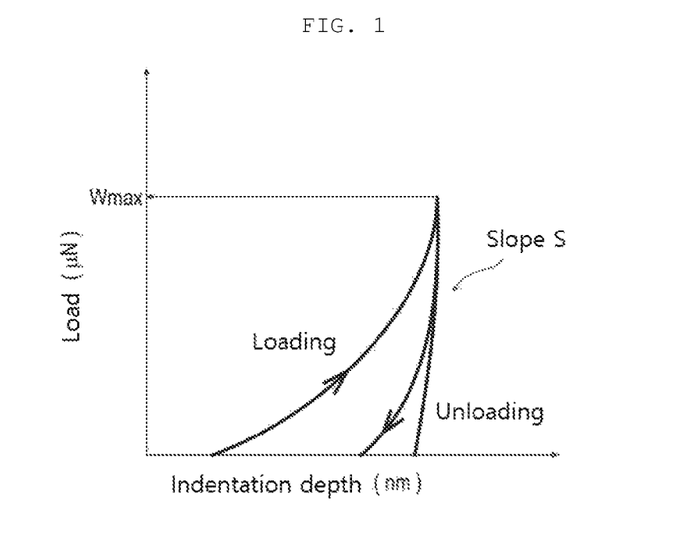
FIG. 1 is an example of a load-displacement curve from a surface hardness measurement method before and after immersing the polyimide-based film of the present invention in 2-methoxyethanol.

A surface hardness (H) of the polyimide-based film was measured using a nanoindentation method and calculated by the above equation of H=W/A (W: load, A: contact area). When deformation evaluation using the nanoindentation method is performed, the contact area (A) where deformation occurs is not directly determined by impression by a very low load. Instead of that, in the nanoindentation method, a diamond indenter having a tip radius of a submicrometer size is used to measure an impression depth occurring while adding a low load at or less than mN to the surface of a sample, thereby calculating the contact area. A load-displacement curve diagram (S) obtained from the measurement may be used to perform quantitative evaluation for elasto-plastic deformation of a material. An example of a typical load-displacement curve is illustrated in FIG. 1. Here, in FIG. 1, a slope (S) refers to a gradient of load-displacement (dP/dh), and generally adopted a curve gradient in a maximum load ($P_{max}$).

Figure 2:
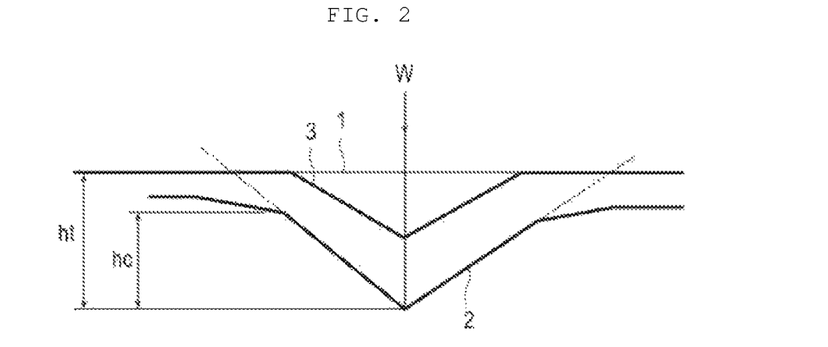
FIG. 2 is an example of calculating a contact area (A) from a surface hardness measurement method before and after immersing the polyimide-based film of the present invention in 2-methoxyethanol.

The following contact area (A) was determined by the following equation:

$$A = K \cdot h_c^2, \quad K = 3 \times 3^{1/2} \tan^2 \alpha$$

wherein, referring to illustration in FIG. 2, in $h_c = h_t - \varepsilon \cdot W/S$, $\varepsilon$ is an indenter-specific constant and S is a gradient of load-displacement. $\alpha$ is a value measured by a surface profile depending on a contact state between a diamond indenter and a sample of hc and ht, and an angle depending on a use indenter. hc is a depth from a free surface to a contact point of a sample, and ht is a maximum impression depth when applying a load by an indenter.

In FIG. 2, 1 is an initial surface of a sample, 2 is a profile of a sample surface when applying a load by an indenter, and 3 is a profile of a sample surface after removing the indenter.

The surface hardness in the present invention was measured using a nanoindenter (Nano Indenter TMXP/DCM) available from MTS Systems. The use indenter is triangular indenter ($\varepsilon=0.726$, $\alpha=45°$). When measuring a hardness, a load was determined as an average value of numerical values measured at five points in a sample of 2 cm×2 cm with 10 to 100 µN. As the measurement sample, the polyimide-based films produced in the Examples and the Comparative Examples were immersed in 2-methoxyethanol at 25° C. for 5 minutes, then 2-methoxyethanol on the surface was removed using a wiper, and then measurement was performed.

Surface hardness change rate=(surface hardness
before immersion in 2-methoxyethanol−surface
hardness after immersion in 2-methoxyethanol)/
surface hardness before immersion in
2-methoxyethanol×100

(2) Haze (%)

The polyimide-based films produced in the Examples and the Comparative Examples were measured in accordance with the standard of ASTM D1003, using HAZE METER (Nippon Denshoku, NDH 5000A). A haze increase rate was calculated as follows, by measuring haze before and after immersing the film in methyl ethyl ketone for 5 minutes:

Haze increase rate=(haze before immersion in
methyl ethyl ketone−haze after immersion in
methyl ethyl ketone)/haze before immersion in
methyl ethyl ketone×100

(3) Rainbow Evaluation

Whether there is a rainbow phenomenon in a visible light area by optical interference was confirmed with the naked eye. Here, the opposite surface of the film coating layer of a cover window was treated to be blacken for clearly confirming the rainbow phenomenon, and then evaluation was performed under a three-wavelength lamp in a darkroom. Depending on a rainbow occurrence degree, evaluation was divided into poor, normal, and excellent, and an evaluation criterion is as follows:

○: excellent (no rainbow is seen; uniform color is shown)
Δ: normal (weak rainbow phenomenon is seen; uniform color is shown)
X: poor (strong rainbow is seen; strong color is shown)

Preparation Example 1

100 parts by weight of dimethylacetamide (DMAc) and 2,2'-bis(trifluoromethyl)-benzidine (TFMB) were added to a reactor under a nitrogen atmosphere and were sufficiently stirred, 10 parts by weight of 4,4'-hexafluoroisopropylidene diphthalic anhydride (6FDA) was added thereto, and sufficient stirring was performed until the reactant was dissolved. Thereafter, 10 parts by weight of cyclobutene tetracarboxylic dianhydride (CBDA) was added and sufficient stirring was performed until the reactant was dissolved. Thereafter, 80 parts by weight of terephthaloyl dichloride (TPC) was introduced and stirring was performed for 6 hours to carry out dissolution and reaction, thereby producing a polyamic acid resin composition. The content of each monomer was adjusted to have a solid content of the polyamic acid resin composition was 6.5 wt %. Pyridine and acetic anhydride were added to the composition at 2.5-fold of the total moles of the dianhydrides and stirring was performed at 60° C. for 1 hour. Thereafter, the solution was precipitated in an excessive amount of methanol and then filtering was performed to obtain a solid content, which was dried under vacuum at 50° C. for 6 hours or more to obtain polyamideimide powder. The powder was diluted and dissolved at 20 wt % in DMAc to produce a composition for forming a polyimide-based film.

The obtained composition for forming a polyimide-based film was subjected to solution casting on a glass substrate using an applicator bar coating method. Thereafter, the resultant was heat-treated in a vacuum oven at 270° C. for 1 hour and cooled down to room temperature, and a film formed on the glass substrate was separated from the substrate to obtain a polyamideimide film having a thickness of 45 µm.

Preparation Example 2

Dimethylacetamide (DMAc) and 2,2'-bis(trifluoromethyl)-benzidine (TFMB) were added to a reactor under a nitrogen atmosphere and sufficiently stirred, terephthaloyl dichloride (TPC) was added thereto, and stirring was performed for 6 hours to carry out dissolution and reaction. Thereafter, an excessive amount of methanol was used to perform precipitation and filtration to obtain a reaction product, which was dried under vacuum at 50° C. for 6 hours or more and added again with DMAc to the reactor under the nitrogen atmosphere to be dissolved, 4,4'-hexafluoroisopropylidene diphthalic anhydride (6FDA) was added thereto, and sufficient stirring was performed until the reactant was dissolved. Subsequently, pyridine and acetic anhydride were added to the solution at 2.5-fold of the total added amounts of the dianhydrides and stirring was performed at 60° C. for 1 hour. Here, the amount of each monomer was such that a mole ratio of TFMB:6FDA:TPC was 100:14:86, and the solution was adjusted to have a solid content of 12 wt %. The viscosity of the finally obtained polyamideimide was 33,000 cps, as measured using a Brookfield viscometer at 25° C.

The obtained composition for forming a polyimide-based film was subjected to solution casting on a glass substrate using an applicator bar coating method. Thereafter, the resultant was heat-treated in a vacuum oven at 270° C. for 1 hour and cooled down to room temperature, and a film formed on the glass substrate was separated from the substrate to obtain a polyamideimide film having a thickness of 52 µm.

Preparation Example 3

Dimethylacetamide (DMAc) and 2,2'-bis(trifluoromethyl)-benzidine (TFMB) were added to a reactor under a nitrogen atmosphere and sufficiently stirred, terephthaloyl dichloride (TPC) was added thereto, and stirring was performed for 6 hours to carry out dissolution and reaction. Thereafter, an excessive amount of methanol was used to perform precipitation and filtration to obtain a reaction product, which was dried under vacuum at 50° C. for 6 hours or more and added again with DMAc to the reactor under the nitrogen atmosphere to be dissolved, 4,4'-hexafluoroisopropylidene diphthalic anhydride (6FDA) was added thereto, and sufficient stirring was performed until the reactant was dissolved. Subsequently, Pyridine and acetic anhydride were added to the solution at 2.5-fold of the total added amounts of the dianhydrides and stirring was performed at 60° C. for 1 hour. Here, the amount of each monomer was such that a mole ratio of TFMB:6FDA:TPC was 100:14:86, and the solution was adjusted to have a solid content of 12 wt %. The viscosity of the finally obtained polyamideimide was 33,000 cps, as measured using a Brookfield viscometer at 25° C.

The obtained composition for forming a polyimide-based film was subjected to solution casting on a Yellow PI film (Upilex-S 125 available from Ube) using a slot die. Thereafter, the resultant was heat-treated in a vacuum oven at 270° C. for 1 hour and cooled down to room temperature, and a film formed on the Yellow PI film was separated to obtain a polyamideimide film having a thickness of 58 μm.

Preparation Examples 4 to 10

2-(3,4-Epoxycyclohexyl)ethyltrimethoxysilane (ECTMS available from TCI) and water were mixed at a ratio of 24.64 g:2.70 g (0.1 mol: 0.15 mol) to prepare a reaction solution and placed in a 250 ml 2-neck flask. 0.1 mL of a tetramethylammonium hydroxide catalyst (Aldrich) and 100 mL of tetrahydrofuran (Aldrich) were added to the mixture and stirred at 25° C. for 36 hours. Thereafter, layer separation was performed, a product layer was extracted with methylene chloride (Aldrich), moisture was removed from the extract with magnesium sulfate (Aldrich), and the solvent was vacuum-dehydrated to obtain an epoxy siloxane resin. As a result of measuring the epoxy siloxane resin using gel permeation chromatography (GPC), a weight average molecular weight was 2,500 g/mol.

The epoxy siloxane resin, the crosslinking agent, the photoinitiator, and the organic solvent were mixed at a weight ratio in Table 1 to prepare compositions for forming a coating layer.

TABLE 1

| Classification | Epoxy siloxane resin content (wt %) | Content of crosslinking agent (wt %) A | Content of crosslinking agent (wt %) B | Photo-initiator content (wt %) | Coating solvent (kind/content: wt %) |
|---|---|---|---|---|---|
| Preparation Example 4 | 30 | 10 | 5 | 0.5 | C/54.5 |
| Preparation Example 5 | 40 | 5 | — | 0.5 | D/54.5 |
| Preparation Example 6 | 50 | 5 | — | 0.5 | C/44.5 |
| Preparation Example 7 | 45 | — | 5 | 0.5 | D/49.5 |
| Preparation Example 8 | 30 | 10 | 5 | 0.5 | E/54.5 |
| Preparation Example 9 | 30 | 10 | 5 | 0.5 | F/54.5 |
| Preparation Example 10 | 30 | 10 | 5 | 0.5 | G/54.5 |

A: (3,4-epoxycyclohexyl)methyl-3',4'-epoxycyclohexane carboxylate
B: Bis[(3,4-epoxycyclohexyl)methyl] adipate
Photoinitiator: (4-Methylphenyl)[4-(2-methylpropyl)phenyl]iodonium hexafluorophosphate
C: Methyl ethyl ketone (MEK)
D: Methyl phenyl ketone (MPK)
E: Dimethylacetamide (DMAc)
F: 2-Methoxyethanol
G: 2-Ethoxyethanol Examples 1 to 7, and Comparative Examples 1 to 4

In Examples 1 to 7 and Comparative Examples 1 to 4, a film for a cover window in which a coating layer was formed using Preparation Examples 4 to 10 on one surface of the polyimide-based film produced in Preparation Examples 1 to 3, was produced, as shown in the following Table 2.

That is, both surfaces of the polyimide-based film produced in Preparation Examples 1 to 3 were surface-treated. Here, the surface treatment was performed by a method of heat treatment under a solvent vapor atmosphere or heat treatment under a nitrogen atmosphere, as shown in Table 2, respectively, and when the surface treatment was performed under the solvent vapor atmosphere, the heat treatment was performed at 280° C. and when the surface treatment was performed under the nitrogen ($N_2$) atmosphere, the heat treatment was performed at a temperature of $T_g+10°$ C. of the polyimide-based film.

After a coating layer was formed on the polyimide-based film which was surface-treated as described above, the composition for forming a coating layer of Preparation Examples 4 to 10 was subjected to solution casting using a slot die so that the solid content was 150 g/m².

After casting, the resultant was dried at 60° C. for 3 minutes using a drier, and irradiated with a ultraviolet lamp at a light quantity of 1,000 mJ/cm² to produce a film for a cover window in which a coating layer was formed on the polyimide-based film.

TABLE 2

| | Polyimide-based film | Polyimide-based film surface treatment method/time | Coating layer | Coating layer direction |
|---|---|---|---|---|
| Example 1 | Preparation Example 1 | MEK atmosphere/20 minutes | Preparation Example 4 | Air surface |
| Example 2 | Preparation Example 2 | MPK atmosphere/20 minutes | Preparation Example 5 | Air surface |
| Example 3 | Preparation Example 3 | MEK atmosphere/20 minutes | Preparation Example 6 | Belt surface |
| Example 4 | Preparation Example 1 | MPK atmosphere/20 minutes | Preparation Example 7 | Belt surface |
| Example 5 | Preparation Example 1 | MEK atmosphere/20 minutes | Preparation Example 8 | Air surface |
| Example 6 | Preparation Example 1 | MEK atmosphere/20 minutes | Preparation Example 9 | Air surface |
| Example 7 | Preparation Example 1 | MEK atmosphere/20 minutes | Preparation Example 10 | Air surface |
| Comparative Example 1 | Preparation Example 1 | Not treated | Preparation Example 4 | Air surface |
| Comparative Example 2 | Preparation Example 2 | Not treated | Preparation Example 5 | Air surface |
| Comparative Example 3 | Preparation Example 3 | $N_2$ atmosphere/20 minutes | Preparation Example 6 | Belt surface |
| Comparative Example 4 | Preparation Example 2 | MPK atmosphere/2 hours | Preparation Example 7 | Belt surface |

Air surface: surface opposite to a support used when forming a polyimide-based film (glass or Yellow Pi film surface)
Belt surface: opposite surface to Air surface For the polyimide-based film which was surface-treated before forming a coating layer, the surface hardness was measured before being immersed in 2-methoxyethanol and shown in the following Table 3, and thereafter, the polyimide-based film which was surface-treated before forming a coating layer was immersed in 2-methoxyethanol at 25° C. for 5 minutes, 2-methoxyethanol on the surface was removed using a wiper, and then a surface hardness change rate was measured and shown in Table 3.

TABLE 3

| | Surface hardness before immersion in solvent (GPa) | Surface hardness after immersion in solvent (GPa) | Surface hardness change rate after immersion in solvent (%) |
|---|---|---|---|
| Example 1 | 0.147 | 0.173 | 18 |
| Example 2 | 0.138 | 0.167 | 21 |

TABLE 3-continued

|  | Surface hardness before immersion in solvent (GPa) | Surface hardness after immersion in solvent (GPa) | Surface hardness change rate after immersion in solvent (%) |
|---|---|---|---|
| Example 3 | 0.142 | 0.190 | 34 |
| Example 4 | 0.157 | 0.166 | 6 |
| Example 5 | 0.147 | 0.173 | 18 |
| Example 6 | 0.147 | 0.173 | 18 |
| Example 7 | 0.147 | 0.173 | 18 |
| Comparative Example 1 | 0.139 | 0.145 | 4 |
| Comparative Example 2 | 0.144 | 0.151 | 5 |
| Comparative Example 3 | 0.148 | 0.152 | 3 |
| Comparative Example 4 | 0.156 | 0.213 | 37 |

For the surface-treated polyimide film used for production in Examples 1 to 7 and Comparative Examples 1 to 4, the haze before immersion in methyl ethyl ketone was measured and is shown in Table 4, and thereafter, the surface-treated polyimide film was immersed in methyl ethyl ketone of 25° C. for 5 minutes, methyl ethyl ketone on the surface was removed using a wiper, and the haze change rate was measured and is shown in Table 4. In addition, the rainbow evaluation of the film for a cover window produced in Examples 1 to 7 and Comparative Examples 1 to 4 was performed and is shown in Table 4.

TABLE 4

|  | Haze before immersion in solvent (%) | Haze after immersion in solvent (%) | Haze increase rate after immersion in solvent (%) | Rainbow evaluation |
|---|---|---|---|---|
| Example 1 | 0.75 | 1.21 | 62 | ○ |
| Example 2 | 0.65 | 1.01 | 48 | ○ |
| Example 3 | 0.58 | 1.01 | 57 | ○ |
| Example 4 | 0.52 | 1.18 | 88 | ○ |
| Example 5 | 0.75 | 1.21 | 62 | ○ |
| Example 6 | 0.75 | 1.21 | 62 | ○ |
| Example 7 | 0.75 | 1.21 | 62 | ○ |
| Comparative Example 1 | 0.61 | 0.80 | 25 | X |
| Comparative Example 2 | 0.53 | 0.84 | 42 | Δ |
| Comparative Example 3 | 0.48 | 0.71 | 31 | X |
| Comparative Example 4 | 0.78 | 2.09 | 175 | ○ |

As shown in the above Table 3, in the Examples satisfying the surface hardness change rate of 6 to 35% according to the present invention, the haze increase rate under a harsh environment may be reduced, and in particular, the rainbow phenomenon in which iridescent stains occur may be suppressed, and thus, visibility was confirmed to be excellent. Furthermore, a coating layer was formed after the polyimide-based film was heat-treated under a solvent vapor atmosphere, thereby achieving the effect. In particular, it was confirmed that the polyimide-based film had the surface hardness change rate satisfying 6 to 35%, when the test was performed at a temperature of 260 to 300° C. for 10 to 60 minutes under a polar solvent vapor atmosphere, and a coating layer was formed on the polyimide-based film satisfying the surface hardness change rate, thereby achieving the physical properties to be desired.

Thus, the film for a cover window according to the present invention has excellent display quality and significantly reduced distortion phenomenon by light even when the coating layer is formed on the polyimide-based film. Accordingly, a display device in which the rainbow phenomenon in which iridescent stains occur is significantly improved, and user's eye stain may be minimized with excellent visibility, may be provided.

The polyimide-based film according to the present invention may significantly improve a rainbow phenomenon.

The film for a cover window according to the present invention may have excellent display quality and reduce a rainbow phenomenon in which iridescent stains occur on a display unit, or the like, even when a coating layer is formed on the polyimide-based film.

In addition, the polyimide-based film and the film for a cover window including the same according to the present invention may be applied to various display fields with excellent optical properties and visibility.

Hereinabove, although the present invention has been described by the specific matters and specific exemplary embodiments, they have been provided only for assisting in the entire understanding of the present invention. Therefore, the present invention is not limited to the exemplary embodiments, and various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A polyimide-based film having a surface hardness change rate of 6 to 35%, wherein the surface hardness change rate is determined by measuring an initial surface hardness, $H_0$ (GPa), of the polyimide-based film, immersing the polyimide-based film in 2-methoxyethanol at 25° C. for 5 minutes, and measuring a surface hardness, $H_1$ (GPa), of the polyimide-based film after being immersed, and calculating the surface hardness change rate according to the following formula:

$$\text{Surface hardness change rate (\%)} = \frac{H_0 - H_1}{H_0} \times 100.$$

2. The polyimide-based film of claim 1, wherein the surface hardness change rate is 10% to 30%.

3. The polyimide-based film of claim 1, wherein $H_0$ is 0.1 to 0.2 GPa.

4. The polyimide-based film of claim 1, wherein when a haze is measured after the film is immersed in methyl ethyl ketone at 25° C. for 5 minutes, a haze increase rate is 100% or less relative to a haze measured before immersion.

5. A film for a cover window, the film comprising:
the polyimide-based film of claim 1; and
a coating layer formed on the polyimide-based film.

6. The film for a cover window of claim 5, wherein the coating layer is any one or more selected from a hard coating layer, a restoration layer, an impact spread layer, a self-cleaning layer, an anti-fingerprint layer, an anti-scratch layer, a low-refractive layer, and an impact absorption layer.

7. The film for a cover window of claim 5, wherein the coating layer has a solid content of 0.01 to 200 g/m², based on a total area of the polyimide-based film.

8. A display device comprising: a display panel and the film for a cover window of claim 5 formed on the display panel.

* * * * *